Patented June 22, 1926.

1,589,885

UNITED STATES PATENT OFFICE.

FRANK ATHERTON HOWARD, OF ELIZABETH, NEW JERSEY, ASSIGNOR TO STANDARD DEVELOPMENT COMPANY, A CORPORATION OF DELAWARE.

MOTOR FUEL AND INTERNAL-COMBUSTION OPERATION.

No Drawing.   Application filed August 16, 1920.   Serial No. 403,656.

My invention relates to motor-fuel and to the method of reducing the "knock" in an internal combustion engine, and will be fully understood from the following specification.

I have discovered that the presence of ammonia ($NH_3$) in the gaseous mixture supplied to an internal combustion engine tends to reduce or prevent the development of what is commonly known as "knocking" or "ping pinging" in the engine and by which I mean the detonation of the fuel mixture or part thereof during its combustion in the combustion chamber of the engine.

The presence of ammonia ($NH_3$) in the gaseous mixture may be effected by the use of the fuel of my invention.

In order to prepare a fuel of my invention, ammonia gas ($NH_3$) is passed through a knock-causing hydrocarbon liquid, for example, gasoline, preferably until the hydrocarbon liquid is saturated with ammonia ($NH_3$).

The fuel of my invention may also be prepared by mixing the knock-causing hydrocarbon liquid with water in which a soap or other emulsifying agent is dissolved or carried, and then passing ammonia gas ($NH_3$) through the hydrocarbon-water emulsion, preferably until the latter is saturated. Any other method may, however, be followed to saturate the mixture with ammonia ($NH_3$).

A third method of preparing the fuel of my invention is by mixing the knock-causing hydrocarbon liquid with an alcohol, for example ethyl alcohol or isopropyl alcohol, and then saturating the mixture with ammonia gas ($NH_3$). In preparing the hydrocarbon-alcohol-ammonia fuel just referred to, either absolute alcohol, i. e., one substantially free from water, may be used, or an alcohol containing a percentage of water. Thus, in the case of anhydrous ethyl or propyl alcohol, from 5 to 20% thereof may suitably be employed.

By the use of the liquid fuel above described, ammonia gas ($NH_3$) will be present in the gaseous mixture supplied to the engine. The "knocking" referred to, may, however, be reduced by injecting into the carburetor or into the engine manifold either (a) ammonia gas ($NH_3$), (b) ammonia water ($NH_4OH$) or (c) alcohol, either absolute alcohol or alcohol having a percentage of water, which alcohol has been saturated with ammonia gas. It will be understood that the injected anti-knock medium just referred to, whether in gaseous or liquid form, may be used in conjunction with any suitable motor fuel.

The invention may, of course, be modified in many respects without departing from the scope of the invention as defined by the appended claims, in which I desire to claim all inherent novelty.

I claim:

1. A motor fuel comprising a knock producing volatile hydrocarbon liquid containing absorbed ammonia.

2. A motor fuel comprising a knock-causing volatile hydrocarbon liquid mixed with a water miscible alcohol, the mixture being saturated with ammonia.

3. A motor fuel comprising a knock-causing volatile hydrocarbon liquid mixed with isopropyl alcohol, the mixture being saturated with ammonia.

4. A motor fuel comprising a knock-causing hydrocarbon liquid mixed with absolute isopropyl alcohol, the mixture being saturated with ammonia.

5. The method of reducing fuel detonation in an internal combustion engine supplied with a gaseous mixture containing knock-causing hydrocarbons which comprises introducing ammonia ($NH_3$) into the gaseous hydrocarbon mixture supplied to said engine.

6. The method of reducing fuel detonation in an internal combustion engine supplied with a gaseous mixture containing knock-causing hydrocarbons which comprises introducing ammonia and alcohol vapors into the gaseous hydrocarbon mixture supplied to said engine.

FRANK ATHERTON HOWARD.